United States Patent
Taibi

[19]

[11] Patent Number: 5,974,723
[45] Date of Patent: Nov. 2, 1999

[54] WEED SHIELDING SPINNER FISHING LURE

[76] Inventor: Jeff A. Taibi, 24202 Okeechobee La., Lake Forest, Calif. 92630

[21] Appl. No.: 09/061,139

[22] Filed: Apr. 16, 1998

[51] Int. Cl.$^6$ .................................................. A01K 91/00
[52] U.S. Cl. ........................ 43/42.13; 43/42.11; 43/42.14; 43/42.19; 43/42.4; 43/42.42
[58] Field of Search .................. 43/42.11, 42.13, 43/42.14, 42.19, 42.2, 42.8, 42.42, 43.2, 43.4, 43.6, 42.25, 42.74, 42.51, 44.84, 42.46, 42.08, 42.4

[56] References Cited

U.S. PATENT DOCUMENTS

| | | | |
|---|---|---|---|
| 1,033,281 | 7/1912 | Skvor et al. | 43/42.08 |
| 1,734,883 | 11/1929 | Shannon | 43/42.13 |
| 2,111,020 | 3/1938 | Arborgast | 43/42.28 |
| 2,242,858 | 5/1941 | Franklin | 43/42.42 |
| 2,769,270 | 11/1956 | Williams | 43/42.74 |
| 2,940,204 | 6/1960 | Mehnert | 43/42.09 |
| 2,960,789 | 11/1960 | Paynter | 43/42.08 |
| 3,996,688 | 12/1976 | Hardwicke, III | 43/42.09 |
| 4,671,007 | 6/1987 | Stanczyk | 43/42.53 |
| 4,718,191 | 1/1988 | Gentry . | |
| 5,138,789 | 8/1992 | Hood | 43/42.13 |
| 5,226,268 | 7/1993 | Sisson, Jr. . | |
| 5,337,509 | 8/1994 | Harold | 43/42.74 |
| 5,381,621 | 1/1995 | Fuller | 43/42.13 |
| 5,394,636 | 3/1995 | Rabideau . | |
| 5,481,821 | 1/1996 | Stanley . | |
| 5,605,004 | 2/1997 | Boullt et al. | 43/42.13 |

*Primary Examiner*—Michael J. Carone
*Assistant Examiner*—Son T. Nguyen
*Attorney, Agent, or Firm*—Gordon K. Anderson

[57] ABSTRACT

The fishing lure is comprised a fishing hook (20) molded into a weighted head (22) covered by a filament skirt (34). A hollow hook arm (42) is attached to the hook and has a loop (44) on the end. A wire weed guard (46) is planar with the hook and disposed within the hollow hook arm to protect the hook from entanglement with vegetation. The hook arm and guard are bent into a bow shape and a blade arm (52) having a noise producing blade (56) is pivotally attached to the loop. A spinner (64) is also attached to the loop with a swivel (66). The lure will buzz, throb, flutter, wiggle and stabilize in a path just below the waters surface while permitting the blade to rotate upon the waters surface for audibly and visibly attracting game fish. A second embodiment replaces the hollow hook arm with a single wire (76) that includes both the hook arm and wire guard.

16 Claims, 3 Drawing Sheets

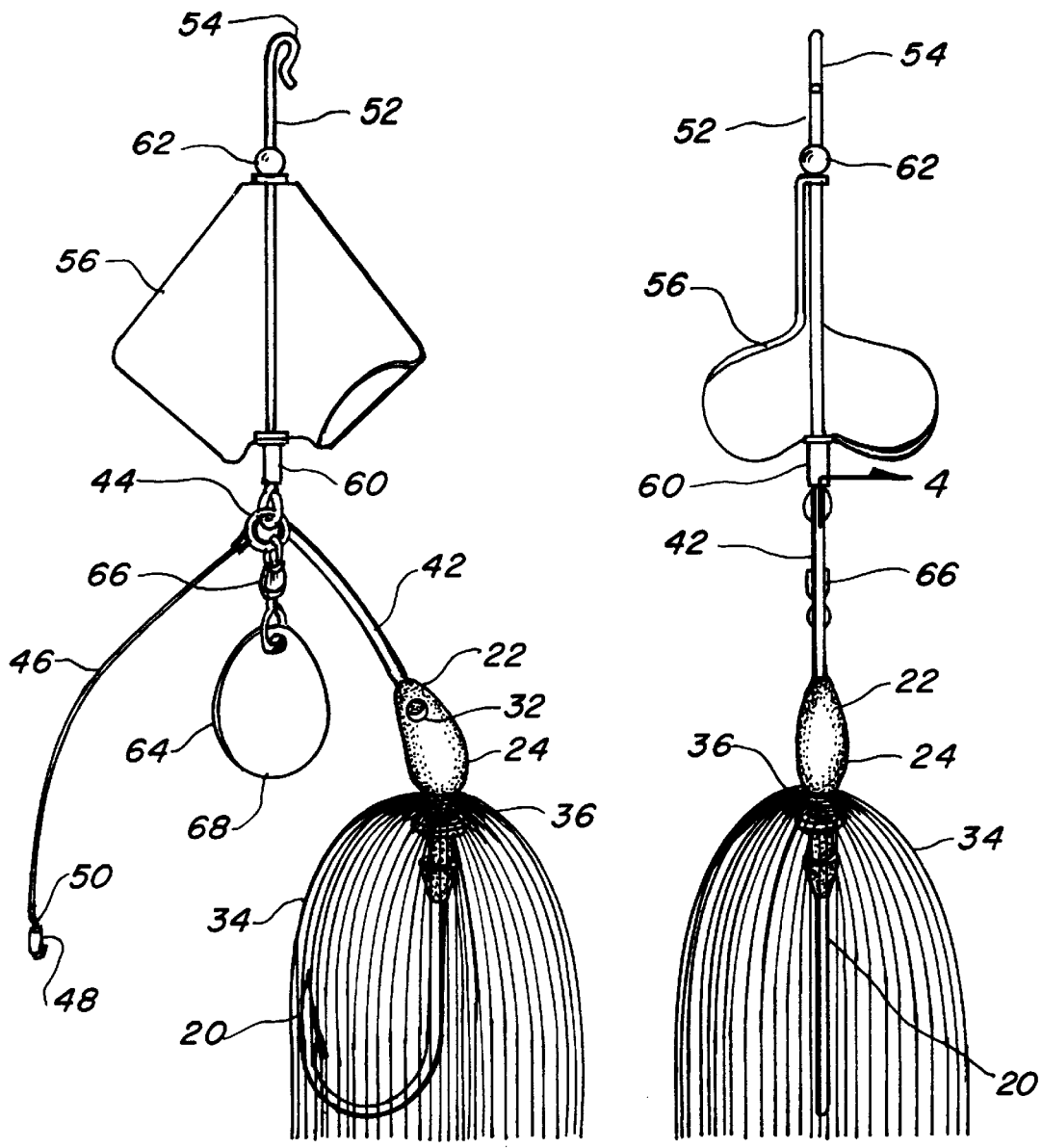
FIG. 1
FIG. 2
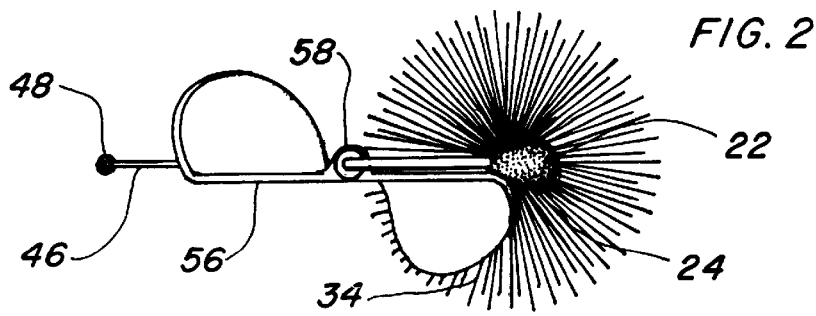
FIG. 3

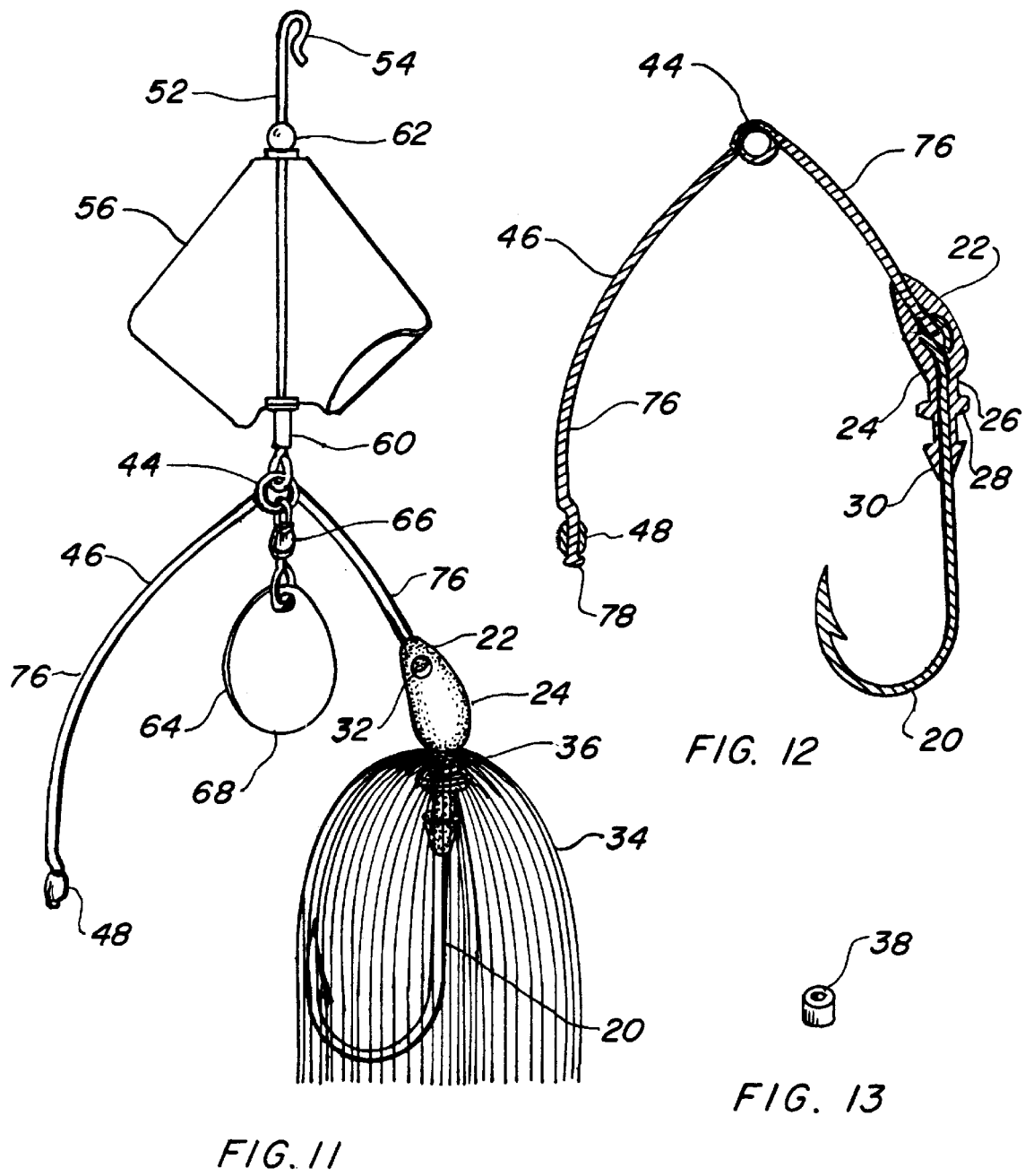

WEED SHIELDING SPINNER FISHING LURE

TECHNICAL FIELD

The present invention relates to artificial fishing lures or fishing bait in general. More specifically, to a fishing lure that includes a hinged noise producing blade and spinner associated with wire weed guard, having a skirt covered hook containing head opposite the weed guard.

BACKGROUND ART

Previously, many types of artificial lures have been used in endeavoring to provide an effective means for producing bait that will constantly attract fish. Prior art generally includes a V-shaped wireform arm or shaft with the spinner, or spinners, on one end and a weighted hook on the other end attached to a metal body.

Usually, the hook is turned toward the arm and a fishing line is secured at the apex of the V-shaped member. In some cases the body is covered with a plastic skirt, which encloses the hook to obscure its identity and add a ripple effect, when the lure is retrieved after casting. Skirts are popular and have been incorporated in most fishing lures in this art for sometime. The skirts are usually single hue, but may be mixed strands or filaments of varied colors.

Spinners have been widely used and are usually mounted on a shaft that permits complete rotation when drawn through the water. The shape of the spinner blade has been developed over the years to a fine art, as it determines not only its rotational speed, but also the angle of descent relative to its rotational axis. A so-called Colorado blade rotates rather slowly and raises the lure in the water, it also adds a flutter effect to the artificial bait. By contrast, the Willow Leaf blade rotates rapidly with a small angle relative to its rotational axis. Other shapes, such as the Indiana and French spinner fall somewhere in-between and have other idiosyncrasies that slightly alter their operational characteristics.

Prior art has also developed noise producing spinners, known as "buzz bait", using multi-blade blades that are mounted onto the wire shaft and are shaped to create a cavitation emitting a sonic pulse. Multiple blades usually include a certain angular relationship that are changed to regulate the noise produced by the spinners making a chattering noise like consecutive vibrant pings rather than dead sounding clicks. Still others have multiple blades striking each other as they rotate.

A search of the prior art did not disclose any patents that read directly on the claims of the instant invention, however the following U.S. patents are considered related:

| U.S. Pat. No. | Inventor | Issue Date |
| --- | --- | --- |
| 5,605,004 | Boullt et al | Feb. 25, 1997 |
| 5,481,821 | Stanley | Jan. 9, 1996 |
| 5,394,636 | Rabideau | Mar. 7, 1995 |
| 5,226,268 | Sisson, Jr. | Jul. 13, 1993 |
| 5,138,789 | Hood | Aug. 18, 1992 |
| 4,718,191 | Gentry | Jan. 12, 1988 |
| 4,617,007 | Stanczyk | Jun. 9, 1987 |

U.S. Pat. No. 5,605,004, issued to Boullt et al, teaches a fishing lure with a pair of outwardly extending arms connected with an arched loop. One of the arms utilizes a hollow tube over the wire shaft for stiffness of the arm. The preferred embodiment of the instant invention employs Boullt et al single wire and hollow tube, however in an entirely different and unique combination, as one arm is used as a weed guard and spinners are attached to the loop and appended shaft.

Stanley, in U.S. Pat. No. 5,481,821, discloses a fishing lure that has a bow shaped arm with one end thinner than the other. The V-shaped wire frame has a hook on one end and a blade on the thinner end. The frame tapers uniformly from one end to the other.

Pat. No. 5,394,636 of Rabideau is for a combined jig and spinner having the benefits of each. The combination permits the blade to rotate in both the rising and falling motions and prevents the spinner from being drawn into the jig head by the Venturi effect.

Sisson, Jr.'s Pat. No. 5,266,268 teaches a lure with a bifurcated frame with a hook on one arm and a spinner on the other. A dive plate, in fan shape, is located near the apex of the frame and is juxtapositioned therebetween. The dive plate creates a bottom hugging lure, as when it is pulled through the water, it steers the lure in a downward direction.

Pat. No. 5,138,789, of Hood, discloses a spinner with hydrodynamic blades having holes for making noise and a journal formed into the body to permit the spinner to rotate concentrically and symmetrically around its attaching wire.

Pat. No. 4,718,191 of Gentry discloses a two-sided angular frame with one or more buzz blades, or spinner blades, mounted on one of the arms. The arm member is free to move or pivot back and forth at the point of attachment, however it will not strike the other parts of the lure. The blades move vigorously from side to side, imitating live bait.

Stanczyk's Pat. No. 4,671,007 teaches a multiple fishing lure fastener having a single continuous wire bent into a V-shape with an eyelet on each end. Skirted hooks are attached into each eyelet and a spinner is attached into a figure-eight formed into the apex of the wire.

It is apparent that most of this prior art utilizes a hook and a generally configured V-shaped shaft with spinners or noise emitting blades on one or both of the arms. The distinction found in this art apparently varies only slightly, making minor improvements functionally different and, consequently, patentably distinguishable.

DISCLOSURE OF THE INVENTION

Noise emitting blades have been used in fishing lures for decades, as a way to attract game fish. The blade, known in the industry as "buzz bait", is extremely effective, however it has a drawback in that when cast, it has a tendency to tumble in the air and foul the line. This phenomena is particularly noticeable when there is a prevailing wind, which severely limits the blades effectiveness. It is, therefore, a primary object of the invention to employ a hinged section with a separate blade arm onto which the noise producing blade is rotatably attached. The hook arm still includes an outward extension of similar length in bow shape, balancing the lure when drawn through the water. The arrangement of utilizing a pivoted arm attached to a loop in the blade arm with the line affixed at it's distal end overcomes the blades inherent line fouling difficulty and improves the functional characteristics of the lure.

An important object of the invention is the addition of a spinner attached with a swivel into a loop formed into the end of the hook arm. The purpose of the added spinner is two-fold, it attracts fish by its vibration, flashing, and intermittently defusing light from its reflective surface as its primary function which has been used for decades in other well known baits. Secondarily the spinner counteracts the tendency for the weight of the head to pull the lure down into the water digging into the surface prohibiting the buzz blade from functioning properly, as the blade should be free to rotate at the waters surface emitting noise and vibrational impulses. This so-called "buzz bait" was designed to run on the surface, therefore, the invention guarantees this functional operation, further the spinner actually slows the speed of the lure when drawn through the water permitting extended time to attract the game fish on each cast. This assurance in operational characteristics, along with its added features of vibration, flashing and speed reduction creates an entirely new and unique device different in overall performance and therefore extremely attractive to the user.

Another object of the invention is that with the use of the combination described above, including the spinner, the skirt runs consistently deeper than conventional baits which normally run close to the surface just barely below the buzz blade. The problem with prior art is that when the fish explode on the surface the momentum is great enough to not allow the hook to set properly or at least dislodge the hook if not securely engaged. The spinner brings the skirt lower in the water allowing the fish better access and therefore a greater probability of hook ups relative to the number of strikes.

Still another object of the invention is the addition of a weed guard to protect the hook from entanglement in water borne vegetation. The weed guard extends from the hook arm since the arm is made using a wire formed into half of a bow-shape, essentially duplicating the shape of the hook arm. The preferred embodiment utilizes a single wire by itself on the weed side of the bow and is covered with a hollow sheath, forming the hook arm on the other bow side. The weed guard obviously shields the barbed end of the hook and is resilient enough to spring away from obstructions as the lure is drawn through the water. Further the guard is stiff enough to stay above the hook, for protection, also if the fish tries to engulf the entire bait including both arms, such as encountered in largemouth fish, the arm flexes out of the way. A second embodiment of the invention utilizes a single wire in bow-shape formed with a loop in the middle omitting the hollow sheath entirely. This embodiment is not as flexible, however it functions in like manner and is more cost effective to manufacturer.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment.

FIG. 2 is a right side view of the preferred embodiment.

FIG. 3 is a top view of the preferred embodiment.

FIG. 11 is a front view of the second embodiment.

FIG. 12 is a cross-sectional view taken on the center line of the second embodiment hook arm attached to the hook, head and integral weed guard.

FIG. 13 is a partial isometric view of the elastic band completely removed from the invention for clarity.

FIG. 14 is a partial isometric view of the metallic ring completely removed from the invention for clarity.

BEST MODE FOR CARRYING OUT THE INVENTION

Figure 4:
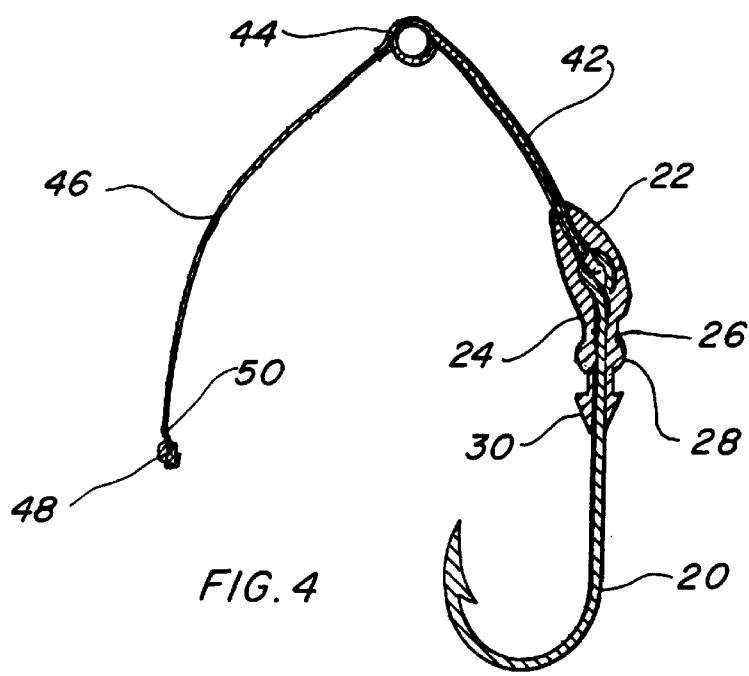
FIG. 4 is a cross-sectional view taken along lines 4—4 of FIG. 2, illustrating the attachment of the hook arm to the hook in cross-section.

The best mode for carrying out the invention is presented in terms of a preferred and second embodiment. Both embodiments are primarily designed alike in ancillary equipment, except the hollow hook arm is omitted and the hook arm is integral with the weed guard, as it is formed of the same wire and includes the same loop in the middle.

The preferred embodiment, as shown in FIGS. 1 through 10, 12 and 13, is comprised of a barbed fishing hook 20, molded into a weighted head 22, with its obvious purpose of retaining fish. The hook 20 may be of any style and construction, as it is well known in the art. The hook size, however is usually from 1/0 to 1%, depending on the application. The weighted head 22 that encompasses the hook 20 provides mass and visual recognition for the quested fish. The head 22, shown best in FIGS. 4 and 12, consists of a head portion 24, neck 26, collar 28, and trailer keeper 30, and is constructed of a relatively heavy material, preferably metal. A lead alloy is preferred for use having a combination of lead, tin and antimony, such as 1 to 3 percent tin, 5 to 6 percent antimony, and the balance pure lead. The weighted head is preferably covered with multiple coats of polyurethane paint in bright colors to attract the fish and a painted eye 32 may also be included in a different color to represent some type of bait fish. Any hue or type of paint may be used, and the head may be in almost any configuration, as long as it represents a tempting bait for the type of fish to be caught.

A filament skirt 34 is disposed around the weighted head 22 and fastened with attaching means. The skirt 34 functions to both conceal the hook and attract fish. This skirt 34 is also well known in the art, and is constructed of split plastic or rubber with a skip on both ends for ease of handling and assembly. The skirt 34 may be one color or a combination of colors, and may have different types of materials and hues distending in both directions from the thread binding. From 32 to 120 strands of the skirt are preferred in most lures. The length of the skirt may also vary as to the size of the hook 20 and the type of fish to be caught. FIGS. 1 through 3 and 11 illustrate the skirt in an umbrella shape, however, other shapes function equally well.

The attaching means to fasten the filament skirt 34 around the neck 26 of the weighted head 22 may consist of synthetic and natural blends, such as nylon/cotton blend thread 36, commonly used in tying lures, such as flies and the like, wound continuously and tightly between the head portion 24 and the collar 28, with the ends tied securely. Other acceptable methods include an elastic band 38 formed of a stretchable substance, such as rubber, natural or synthetic, and a metallic ring 40, crimped securely in place. FIGS. 1, 2 and 11 illustrate the thread 36 in place and FIG. 13 shows the elastic band 38 alone, and FIG. 14 depicts the alternate metallic ring 40 by itself.

A hollow hook arm 42 is attached to the hook 20 and, likewise, embedded into the head 22. The hook arm 42 includes a formed loop 44 in the distal end, as shown in FIG. 4. The hollow hook arm 42 is constructed of a stainless steel surgical tube, such as used for hypodermic needles. It should also be noted that while stainless steel has been described for the materials of the hook arm 42, other metals may be used with equal ease, such as titanium, INCONEL, etc. The configuration of the hook arm 42 is illustrated best in FIGS. 1, 2 and 4, and is bent into essentially half of a bow shape and angularity attached to the hook 20 with a formed loop well known in the art.

A formed wire weed guard 46 is positioned on the same plane as the hook 20 barbed end and is disposed within the hollow of the hook arm 42 completely through, including the loop 44 and attachment to the hook 20. The exposed end extends outwardly in bow shape sufficiently to protect the hook from entanglement in weeds. The weed guard 46 is made of a round metallic wire, preferably of stainless steel, sometimes referred to as spring wire. The diameter of the wire may vary as to the type of fish the lure is used for, basically ranging from an outside diameter of from 0.026 inches (0.066 cm) to 0.051 inches (0.13 cm), however any other diameter is also acceptable.

A bead 48 may be optionally added at the outwardly extending distal end of the weed guard 46, precluding detainment of weeds when the lure is drawn through weed infested water. The bead 48 is best illustrated in FIGS. 1 and 4 and is held in place with a U-bend offset 50 formed integrally with the wire of the guard 46.

To magnify stiffness and prevent torsional rotation between the arm 42 and guard 46 epoxy resin, or the like, may be placed between the space remaining between the hollow in the hook arm 42 and the outside diameter of the weed guard. This process is known in the art and disclosed by Pat. No. 5,604,004 issued to Boullt et al.

Figures 5, 6, 7:
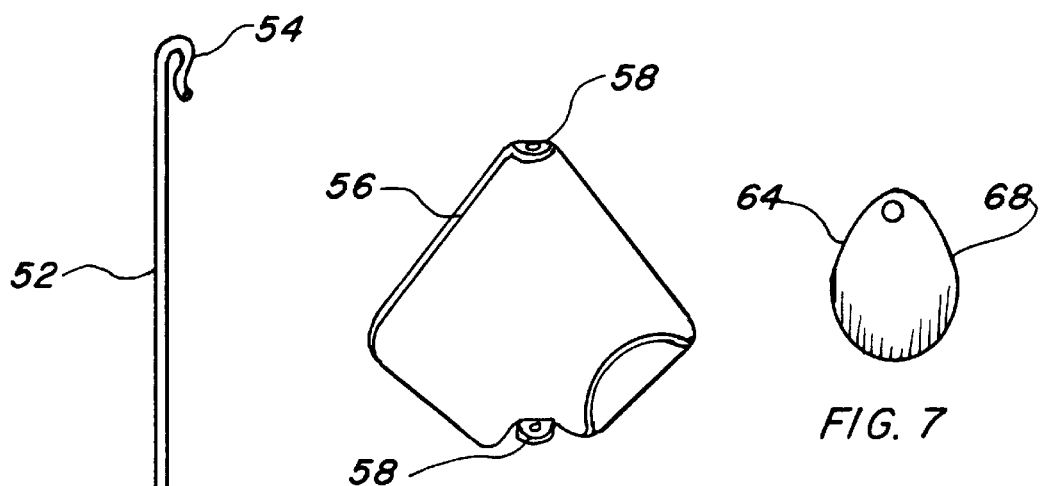
FIG. 5 is a front view of the blade arm completely removed from the invention for clarity.
FIG. 6 is a partial isometric view of the noise producing blade completely removed from the invention for clarity.
FIG. 7 is a front view of the "Colorado" spinner completely removed from the invention for clarity.
Figures 8, 9, 10:
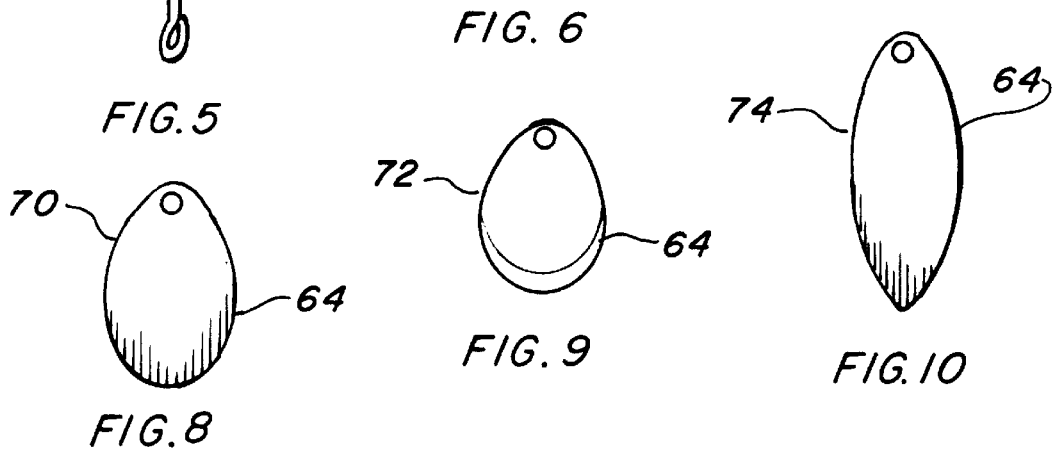
FIG. 8 is a front view of the "Indiana" spinner completely removed from the invention for clarity.
FIG. 9 is a front view of the "French" spinner completely removed from the invention for clarity.
FIG. 10 is a front view of the "Willow Leaf" spinner completely removed from the invention for clarity.

A blade arm 52, shown by itself in FIG. 5, is pivotally connected into the loop 44 in the hook arm 42, as illustrated in FIGS. 1 through 3. This blade arm 52 has a first end, which is loopingly affixed, as described above, and a second end, which includes an open ended eye 54 for attaching to a fishing line.

An oscillating noise producing blade 56 is rotatably joined onto the blade arm 52, as shown in FIGS. 1 and 2, causing the lure to buzz, throb, flutter and wiggle when drawn on the waters surface for audibly and visibly attracting fish. This noise producing blade 56 is commonly known in the art as "buzz bait", or specifically a "buzz blade", as previously discussed. This blade 56 is well known for its ability to create an audible sound and has been successful in attracting fish. This blade 56 may be any style or shape, as long as it produces a buzzing noise, however the preferred blade is configured with a pair of opposed outwardly projecting curved knife-like edges in a propeller shape, as depicted in FIGS. 1 through 3 and 6. The blade 56 further includes a pair of right angle formed fingers 58 having holes within for attachment to the blade arm 52. These holes in the fingers 58 are large enough to permit the blade to freely rotate around the arm 52, and the blade 56 is captivated by a hollow spacer 60 positioned between the first end of the blade arm 52 and a pivot bearing bead 62 on the second end, of the blade arm 52 adjacent to the open ended eye 54. This arrangement captivates the blade 56 while still permitting free and unrestricted rotational movement. A secondary purpose for the spacer 60 is to add another noise source as the material for the blade 56 and spacer 60 is preferably aluminum, the rubbing together of the similar metals creates a distinctive abrasive sound, again contributing to attracting fish.

A spinner 64 is attached with a swivel 66 to the loop 44 in the hook arm 42, as shown in FIG. 1. The spinner is free to rotate and eliminates any counter effects of movement and harmonics of the lure and, more importantly, brings about a stabilizing effect in a path just beneath the surface of the water as well as slowing the speed of the lure in the water. This action counters the effect of the blade 56, which by itself runs on the surface. With the spinner added, the entire action of the lure is altered, creating a new adaptation for the well known buzz bait. Spinners enjoy a wide sophistication in their configuration and intended function characteristics and are available in a variety of styles. With this in mind, it has been found that the so-called "Colorado" spinner 68, shown in FIGS. 1 through 3 and 7, is nearly perfect for the application in either the deep cup or regular form, causing the bait to run at the ideal depth under the surface of the water. While this style is absolute for some areas of fishing, other characteristics may be better suited, therefore other spinners may be substituted with ease and create the perfect combination for a given geographical area. The other styles of spinners available are the Indiana 70, shown in FIG. 8, the French 72, illustrated in FIG. 9, and the Willow Leaf 74, depicted in FIG. 10. While these styles are illustrated and described, other styles and variations may be used with equal ease. The above described spinners are usually metallic and may be plated with nickel, chrome, gold, copper, etc., or painted any bright color. Since the purpose of the spinner is obviously to attract fish, the combination of color, texture, shape, and configuration may vary as to the type of fish to be attracted and the movement characteristics, along with the depth variations created by each design.

The second embodiment of the invention is illustrated in FIGS. 11 and 12 and is identical with the preferred embodiment, except the wire weed guard 46 and hook arm 42 are integrally formed of a single uniform diameter wire 76. This hook arm and guard wire 76 have the same basic configuration forming a bow shape and the bead 48 and U-shaped offset 50 on the guard end have the same configuration, however they are necessarily larger and the end may be offset and crimped 78, as shown in FIG. 12, or optionally continue in the U-shape bend, as depicted in FIG. 4 of the preferred embodiment.

The second embodiment eliminates the need for expensive surgical tubing for the hollow hook arm 42 by simply increasing the diameter of the weed guard 46 portion. Obviously, this embodiment is more cost effective due to its simplicity, however some small amount of flexibility in the weed guard is sacrificed, as the combined arm wire 76 must be strong enough to maintain its structural integrity for the hook portion, decreasing its ability to deflect when struck by vegetation when drawn through the water.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. An artificial weed shielding spinner fishing lure comprising;

a barbed fishing hook molded into a weighted head for retaining a fish, a filament skirt disposed around the head and fastened with attaching means for concealing the hook and attracting fish, a hollow hook arm attached to the fishing hook and, likewise, embedded into the head, with the hook arm having a loop on a distal end, a formed wire weed guard planar with the fishing hook barbed end and said wire weed guard disposed within a hollow portion of the hook arm, including attachment to the hook, and extending outwardly a sufficient distance to protect the hook from entanglement in weeds, a blade arm, having a first end and a second end, with the first end pivotally affixed into the loop of the hook arm and the second end having an open ended eye for attachment to a fishing line, and an oscillating noise producing blade rotatably affixed onto the blade arm such that the lure will buzz, throb, flutter and wiggle when drawn upon waters surface for audibly and visibly attracting fish.

2. The fishing lure as recited in claim 1 further comprising a spinner having a swivel with the swivel attached to the hook arm loop, the spinner rotatably free to eliminate any counter effects of movement and harmonics of the lure, slow the lures speed and causing the lure to stabilize in a path just beneath waters surface leaving the blade to rotate freely upon waters surface.

3. The fishing lure as recited in claim 1 wherein said attaching means for joining the skirt to the head further comprises an elastic band formed of a resilient and stretchable substance.

4. The fishing lure as recited in claim 1 wherein said attaching means for joining the skirt to the head further comprises synthetic and natural blends of thread wound continuously and tightly around the head with the thread's ends tied securely.

5. The fishing lure as recited in claim 1 wherein said attaching means for joining the skirt to the head further comprises a metallic ring crimped securely around the head.

6. The fishing lure as recited in claim 1 further comprising resin disposed within spaces remaining between the hollow in the whole hook arm and the whole wire weed guard to magnify stiffness and prevent torsional rotation between the arm and the guard.

7. The fishing lure as recited in claim 1 further comprising a bead on the outwardly extending end of the wire weed guard for precluding detainment of weeds when the lure is drawn through weed infested water.

8. The fishing lure as recited in claim 1 further comprising a hollow spacer disposed upon the blade arm between the noise producing blade and the first end of the blade arm and a bead disposed upon the blade arm between the second end of the blade arm and the noise producing blade permitting free and unrestricted rotation of the blade.

9. The fishing lure as recited in claim 2 wherein the spinner is a Colorado type.

10. The fishing lure as recited in claim 2 wherein the spinner is a Willow Leaf type.

11. The fishing lure as recited in claim 2 wherein the spinner is a French type.

12. The fishing lure as recited in claim 2 wherein the spinner is a Indiana type.

13. An artificial weed shielding spinner fishing lure comprising;

a barbed fishing hook molded into a weighted head for retaining a fish, a filament skirt disposed around the head and fastened with attaching means for concealing the hook and attracting fish, a hook arm attached to the barbed fishing hook and, likewise, embedded into the head, with the hook arm having a loop on a distal end, a formed wire weed guard planar with the fishing hook barbed end and said wire weed guard is integral with the hook arm, and extending outwardly a sufficient distance to protect the hook from entanglement in weeds, a blade arm, having a first end and a second end, with the first end pivotally affixed into the loop of the hook arm and the second end having an open ended eye for attachment to a fishing line, an oscillating noise producing blade rotatably affixed onto the blade arm such that the lure will buzz, throb, flutter and wiggle when drawn upon waters surface for audibly and visibly attracting fish, and a spinner having a swivel attached to the hook arm loop, the spinner rotatably free to eliminate any counter effects of movement and harmonics of the lure, slow the lures speed and causing the lure to stabilize in a path just beneath waters surface leaving the blade to rotate freely upon waters surface.

14. The fishing lure as recited in claim 13 wherein the spinner is a Colorado type.

15. The fishing lure as recited in claim 13 further comprising a bead on the outwardly extending end of the wire weed guard for precluding detainment of weeds when the lure is drawn through weed infested water.

16. The fishing lure as recited in claim 13 further comprising a hollow spacer disposed upon the blade arm between the noise producing blade and the first end of the blade arm and a bead disposed upon the blade arm between the second end of the blade arm and the noise producing blade permitting free and unrestricted rotation of the blade.

\* \* \* \* \*